(12) United States Patent
Gross et al.

(10) Patent No.: US 10,796,242 B2
(45) Date of Patent: Oct. 6, 2020

(54) ROBUST TRAINING TECHNIQUE TO FACILITATE PROGNOSTIC PATTERN RECOGNITION FOR ENTERPRISE COMPUTER SYSTEMS

(71) Applicant: Oracle International Corporation, Redwood Shores, CA (US)

(72) Inventors: Kenny C. Gross, Escondido, CA (US); Kalyanaraman Vaidyanathan, San Diego, CA (US); Craig R. Schelp, Surrey (CA); Andrew E. Brownsword, Bowen Island (CA)

(73) Assignee: Oracle International Corporation, Redwood Shores, CA (US)

( * ) Notice: Subject to any disclaimer, the term of this patent is extended or adjusted under 35 U.S.C. 154(b) by 1078 days.

(21) Appl. No.: 15/247,251

(22) Filed: Aug. 25, 2016

(65) Prior Publication Data
US 2018/0060752 A1  Mar. 1, 2018

(51) Int. Cl.
*G06N 20/00* (2019.01)
*G06F 11/07* (2006.01)
(Continued)

(52) U.S. Cl.
CPC ............ *G06N 20/00* (2019.01); *G06F 11/00* (2013.01); *G06F 11/0751* (2013.01);
(Continued)

(58) Field of Classification Search
CPC ..... G06N 20/00; G06F 11/00; G06F 11/3447; G06F 11/3409; G06F 11/0751; G06F 11/3058
See application file for complete search history.

(56) References Cited

U.S. PATENT DOCUMENTS 5,210,704 A * 5/1993 Husseiny ............... G01H 1/003
702/34
6,898,469 B2 * 5/2005 Bickford ............ G05B 23/0254
700/30

(Continued)

FOREIGN PATENT DOCUMENTS

CN  104506162 A  4/2015
WO  02073351 A2  9/2002

OTHER PUBLICATIONS

Advanced Pattern Recognition for Detection of Complex Software Aging Phenomena in Online Transaction Processing Servers Cassidy et al. (Year: 2002).*

(Continued)

*Primary Examiner* — Kakali Chaki
*Assistant Examiner* — Ababacar Seck
(74) *Attorney, Agent, or Firm* — Park, Vaughan, Fleming & Dowler LLP (57) ABSTRACT

The disclosed embodiments relate to a technique for training a prognostic pattern-recognition system to detect incipient anomalies that arise during execution of a computer system. During operation, the system gathers and stores telemetry data obtained from n sensors in the computer system during operation of the computer system. Next, the system uses the telemetry data gathered from the n sensors to train a baseline model for the prognostic pattern-recognition system. The prognostic pattern-recognition system then uses the baseline model in a surveillance mode to detect incipient anomalies that arise during execution of the computer system. The system also uses the stored telemetry data to train a set of additional models, wherein each additional model is trained to operate with one or more missing sensors. Finally, the system stores the additional models to be used in place of the (Continued)

baseline model when one or more sensors fail in the computer system.

14 Claims, 5 Drawing Sheets

(51) Int. Cl.
*G06F 11/34* (2006.01)
*G06F 11/00* (2006.01)
*G06F 11/30* (2006.01)

(52) U.S. Cl.
CPC ...... *G06F 11/3409* (2013.01); *G06F 11/3447* (2013.01); *G06F 11/3058* (2013.01)

(56) References Cited

U.S. PATENT DOCUMENTS

| | | | | |
|---|---|---|---|---|
| 7,020,802 B2* | 3/2006 | Gross | ............... | G06F 11/3476 714/37 |
| 7,292,952 B1* | 11/2007 | Gross | ............... | G06F 11/3058 702/104 |
| 7,308,385 B2* | 12/2007 | Wegerich | ........... | G05B 23/0254 700/108 |
| 7,369,932 B2 | 5/2008 | Kim et al. | | |
| 7,734,451 B2* | 6/2010 | MacArthur | ........ | G05B 13/0295 703/2 |
| 7,818,276 B2* | 10/2010 | Veillette | ............. | G05B 23/0245 700/29 |
| 8,423,484 B2 | 4/2013 | Pecht et al. | | |
| 8,706,451 B1* | 4/2014 | Gross | ............... | G06F 11/0706 703/2 |
| 9,084,937 B2 | 7/2015 | Gadher et al. | | |
| 2003/0139908 A1* | 7/2003 | Wegerich | ........... | G05B 23/0254 702/183 |
| 2006/0036403 A1* | 2/2006 | Wegerich | ........... | G05B 23/0254 702/183 |
| 2008/0082195 A1* | 4/2008 | Samardzija | .......... | G05B 23/021 700/109 |
| 2008/0255807 A1* | 10/2008 | Gross | ..................... | G06F 11/30 702/186 |
| 2009/0271046 A1* | 10/2009 | Lewis | ..................... | G06F 11/30 700/291 |
| 2010/0082299 A1* | 4/2010 | Dhanekula | ............... | G06F 1/206 702/186 |
| 2010/0145891 A1* | 6/2010 | Dhanekula | ............. | G06N 20/00 706/12 |
| 2010/0161810 A1 | 6/2010 | Vaidyanathan et al. | | |
| 2010/0318828 A1* | 12/2010 | Elting | ................. | G06F 11/3062 713/340 |
| 2015/0073751 A1 | 3/2015 | Liao et al. | | |

OTHER PUBLICATIONS

Advanced electronic prognostics through system telemetry and pattern recognition methods (Year: 2007).*
Multivariate State Estimation Technique for Remaining Useful Life Prediction of Electronic Products (Year: 2014).*
Proactive Detection of Software Aging Mechanisms in Performance Critical Computers Gross et al. (Year: 2002).*
Reliability Through Telemetry Kenny Gross (Year: 2014).*
Ramasso et al.; "Review and Analysis of Algorithmic Approaches Developed for Prognostics on CMAPSS Dataset", downloaded from https://ntrs.nasa.gov/archive/nasa/casi.ntrs.nasa.gov/20150007677.pdf on Jan. 4, 2017.
Wang et al.; "A Generic Bayesian Framework for Real-Time Prognostics and Health Management (PHM)", 50th AIAA/ASME/ASCE/AHS/ASC Structures, Structural Dynamics, and Materials Conference, 17th, May 4-7, 2009, Palm Springs, CA.

* cited by examiner

ROBUST TRAINING TECHNIQUE TO FACILITATE PROGNOSTIC PATTERN RECOGNITION FOR ENTERPRISE COMPUTER SYSTEMS

BACKGROUND

Field

The disclosed embodiments generally relate to prognostic surveillance techniques that are used detect operational anomalies in enterprise computer systems. More specifically, the disclosed embodiments relate to a robust training technique to train a prognostics model that is used to detect incipient anomalies that arise during operation of an enterprise computer system.

Related Art

Enterprise computing systems often monitor telemetry data obtained from internal physical sensors and software resources to diagnose operational issues that might arise and, if necessary, issue warnings of impending problems. However, commonly used threshold-based warnings and diagnostics are "reactive" in nature; by the time a threshold limit has been exceeded, the problem is already severely affecting system performance (or the system has crashed). Because of the business-critical nature of enterprise and cloud computing systems, this endemic limitation of threshold-based diagnostics has motivated the development of predictive analytic techniques to proactively alert system operators of incipient anomalies, such as impending failures or malicious intrusion events, hopefully with enough lead time so that such problems can be avoided or proactively fixed.

Unfortunately, during operation of an enterprise computer system, the sensors that are used to gather this telemetry data commonly fail. If a sensor failure occurs during operation of the enterprise computer system, it is necessary to retrain the prognostic pattern-recognition model that is used to detect incipient anomalies to operate using fewer sensors. At present, this retraining process involves collecting new training data, which is used to retrain the pattern-recognition model to operate using fewer sensors. Moreover, during this retraining process, the enterprise computer system typically enters a "blackout period," which can last many days, during which the predictive analytic techniques cannot be used, which leaves the enterprise computer system vulnerable to incipient anomalies, which could have been detected by the predictive analytic techniques.

Hence, what is needed is a method and an apparatus that facilitates using prognostic pattern-recognition techniques after a sensor failure to detect incipient anomalies during operation of an enterprise computer system.

SUMMARY

The disclosed embodiments relate to a technique for training a prognostic pattern-recognition system to detect incipient anomalies that arise during execution of a computer system. During operation, the system gathers and stores telemetry data obtained from n sensors in the computer system during operation of the computer system. Next, the system uses the telemetry data gathered from the n sensors to train a baseline model for the prognostic pattern-recognition system. The prognostic pattern-recognition system then uses the baseline model in a surveillance mode to detect incipient anomalies that arise during execution of the computer system. The system also uses the stored telemetry data to train a set of additional models, wherein each additional model is trained to operate with one or more missing sensors. Finally, the system stores the additional models to be used in place of the baseline model when one or more sensors fail in the computer system.

In some embodiments, training the set of additional models includes: (1) training additional models to operate with any one of the n sensors missing; (2) training additional models to operate with any combination of two of the n sensors missing; and (3) training additional models to operate with more than two of the n sensors missing.

In some embodiments, the set of additional models are trained using background processes while the prognostic pattern-recognition system operates in the surveillance mode.

In some embodiments, when one or more of the n sensors in the computer system fails, the system selects a substitute model selected from the set of additional models, wherein the substitute model was trained without using telemetry data from the one or more failed sensors. The system then updates the prognostic pattern-recognition system to use the substitute model while operating in the surveillance mode.

In some embodiments, while the prognostic pattern-recognition system is operating using the substitute model, the system trains supplemental models to be included in the set of additional models, wherein the supplemental models are trained without using telemetry data from the one or more failed sensors, and without using telemetry data from one or more other non-failed sensors.

In some embodiments, detecting an incipient anomaly includes detecting: an impending failure of the computer system; or a malicious-intrusion event in the computer system.

In some embodiments, the baseline model and the set of additional models are trained using a nonlinear, nonparametric (NLNP) regression technique.

In some embodiments, the telemetry data includes data gathered from physical sensors in the computer system that monitor physical performance parameters, including at least one or more of temperature, voltage, current, vibration, fan speeds, and acoustic parameters. The telemetry data also includes software-related telemetry parameters, including one or more of processor load, memory usage, cache usage, system throughput, queue lengths, I/O traffic, and quality of service (QOS).

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

OVERVIEW

The disclosed embodiments provide a novel technique for robustly training a prognostic surveillance system for a computer system, wherein the surveillance system makes use of a class of pattern-recognition techniques collectively referred to as nonlinear, nonparametric (NLNP) regression. Some existing enterprise computer systems presently use Electronic Prognostics (EP) techniques, which combine time-series telemetry data with advanced pattern-recognition techniques to facilitate proactive detection of anomalies in enterprise servers, storage systems, and networks. For such EP systems, the disclosed embodiments provide a new approach for the robust training of pattern-recognition techniques to facilitate real-time prognostic surveillance.

Figure 1A:
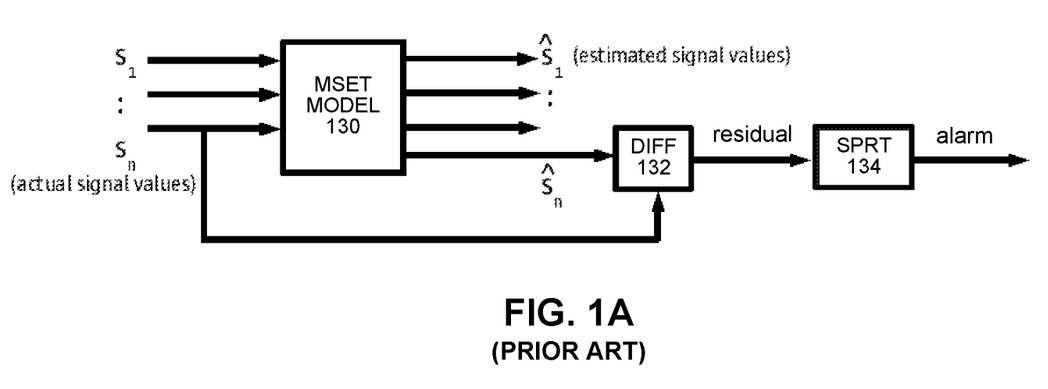
FIG. 1A illustrates a conventional data-driven prognostic-monitoring system.

More specifically, FIG. 1A illustrates how empirical data-driven prognostic monitoring is achieved in existing EP systems. Referring to FIG. 1A, for specific systems, processes, or assets under surveillance, there exist a collection of n time-series sensor signals, $S_1, S_2 \ldots S_n$, that are being monitored. These time-series signals feed into an MSET pattern-recognition model 130, wherein MSET is an acronym for "Multivariate State Estimation Technique." Note that MSET is used in some of the disclosed embodiments. However, the disclosed embodiments can generally use any one of a generic class of pattern-recognition techniques called nonlinear, nonparametric (NLNP) regression, which includes neural networks, auto-associative kernel regression (AAKR), and even simple linear regression (LR).

In the scheme illustrated in FIG. 1A, the MSET model 130 is "trained" to learn patterns of correlation among all of the monitored time-series signals $S_1, S_2 \ldots S_n$. This training process involves a one-time, computationally intensive calculation that is performed offline with accumulated data that contains no anomalies. The pattern-recognition system is then placed into a "real-time surveillance mode," wherein the trained MSET model 130 predicts what each signal should be, based on other correlated variables; these are the "estimated signal values" illustrated in FIG. 1A. Prognostic fault detection is achieved by using a differencing module 132 to perform a pairwise differencing operation between the actual signal values and the estimated signal values. The system then applies a "detection operation" to the residuals generated by the differencing operation by using a Sequential Probability Ratio Test (SPRT) module 134 to detect anomalies and possibly generate an alarm.

The Retraining Challenge

Note that the training of MSET model 130 is often both computationally intensive and memory-intensive, and requires that signals containing no degradation have been archived over a sufficient time period to encompass the full range of dynamics for the monitored time series that will be seen during real-time surveillance. As such, there is a significant cost associated with retraining the prognostic pattern-recognition model.

One type of event that necessitates retraining of existing prognostic models is the sudden loss of one or more sensors. For example, in Internet of Things (IoT) applications, it is increasingly common to use "intelligent wireless motes," which are based upon radio-frequency-ID sensors (RFIDs), to provide supplemental sensing to real-time wired physical transducers in fleets of engineering assets. However, such wireless sensing devices rely on batteries, and batteries eventually need to be replaced or recharged. Hence, time-series signals that originate from intelligent wireless motes can suddenly disappear, and may or may not reappear later (if batteries are replaced or recharged).

In many enterprise and cloud data centers, wireless sensors are beginning to be used in the aisles for temperature and relative humidity (RH) sensing, and these signals are monitored along with signals from thousands of conventional sensors associated with IT systems to facilitate prognostics and improved energy efficiency. Again, these wireless sensors can disappear at any time when batteries fail, necessitating retraining of prognostic pattern-recognition systems. Similarly, for prognostic cybersecurity applications, there exist additional reasons that individual network time-series telemetry signals can disappear, and may or may not reappear at a later time.

Hence, there presently exists a need for a new approach to training prognostic pattern-recognition models, which tolerates one or more sensors suddenly becoming unavailable, without the need to start collecting new training data and consequently causing downtime for the prognostic-monitoring system while retraining operations are being performed.

The disclosed embodiments provide a novel training approach for any prognostic surveillance system that uses n time-series signals, wherein the system is first trained using all n signals, and then immediately put into the real-time surveillance mode. But then "background" processes are spawned in which an MSET model is trained for all combinations of n−1 signals, and each of these n−1 trained models is stored in a "trained model library." Then, all possible combinations of n−2 monitoring modules are trained and added to the trained model library. Next, if an incoming signal disappears during real-time prognostic surveillance, the system immediately retrieves and installs a pre-trained model from the training model library, and the surveillance continues with no blackout periods for prognostic anomaly detection.

In some embodiments, the system stops background training after all combinations of n−1 and n−2 sensor sets are covered. This is because it is unlikely that two sensors will simultaneously disappear at exactly the same sampling observation, and it is extremely unlikely that more than two sensors would all disappear at exactly the same instance in time. Note that for large-scale failures, re-training after repairs would be warranted anyway. Hence, the disclosed embodiments address the use cases where individual sensors disappear either from sensor-failure events, or from battery degradation in the case of wireless motes. Note that these modes of signal loss are very unlikely to affect more than two sensors simultaneously.

In some embodiments, the system operates as follows. During prognostic anomaly surveillance of a system using n time-series signals, if one of those signals suddenly disappears, the system immediately retrieves a pre-trained model with n−1 signals, and prognostic surveillance continues without missing a beat. The same thing happens in the unlikely case in which two signals disappear at the same instant in time; the system retrieves the pre-trained model with n−2 signals and continues surveillance.

When one or two signals disappear, a prognostic alert flag is sent to a system operator's console or a services log file noting that one or two sensors have failed. At this time, the "background" training procedure immediately starts training new n−1 and n−2 models and storing those new pre-trained models in the trained model library. Note that the new n−1 and n−2 models are trained assuming the failed sensors are unavailable, and also assuming that one or two additional sensors have failed.

The original fully trained n-sensor prognostic model is not discarded if an n−1 or an n−2 model is substituted. Instead, the fully trained n-sensor model is retained in the trained model library. This way, when a sensor signal reappears (e.g. a failed sensor is repaired/replaced, or a failed battery is replaced or recharged), the prognostic surveillance system immediately reverts to the previous trained model that included that recovered sensor.

Note that the above-described technique for prognostic training only uses a modest amount of storage space (a few MB for typical prognostic applications, which is insignificant for typical IoT and enterprise prognostic surveillance systems), and also avoids "blackout periods" in prognostic surveillance that were previously required when real-time prognostic algorithms needed to be retrained following sensor-loss events.

This new technique enhances the overall prognostic performance of predictive analytics techniques that use MSET, and also other NLNP regression pattern-recognition techniques, by using a novel training procedure that is robust with respect to the sudden loss of individual sensors from sensor-degradation events and/or from battery exhaustion for wireless motes. Note that re-training prognostic models is computationally intensive (and also memory-intensive) when the number of monitored sensors is high.

When one or more sensors fail, the system immediately enters the surveillance mode with a new model that is trained to use data from all available sensors. The system then spawns one or more background processes that systematically generate all new combinations of n−1 and n−2 pre-trained models that are stored in a library. In this way, if any sensor disappears during prognostic surveillance, or in the unlikely event that two sensors disappear at exactly the same time, the system immediately pulls out the appropriate pre-trained model and continues prognostic surveillance.

Computer System

Figure 1B:
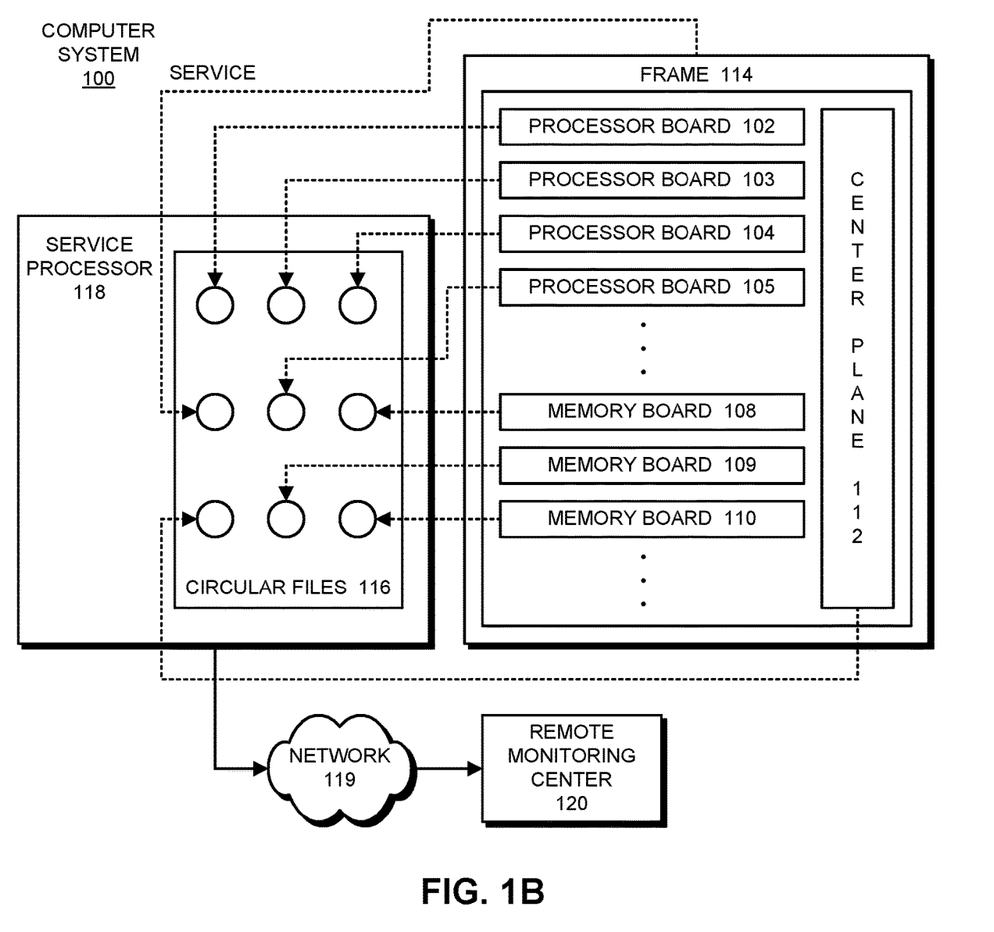
FIG. 1B illustrates a computer system that includes a service processor for processing telemetry signals in accordance with the disclosed embodiments.

We now describe an exemplary implementation of a prognostics system that can obtain telemetry data from: an operating system of the computer system, a set of sensors in the computer system, and/or one or more external sensors that reside outside the computer system. As shown in FIG. 1B, a computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, and/or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. (Note that the software monitors that generate telemetry signals are also referred to as "software sensors" or simply sensors within this specification and the appended claims.) In one or more embodiments, a dedicated circular file is created and used for each FRU within computer system 100. Alternatively, a single comprehensive circular file may be created and used to aggregate performance data for all FRUs within computer system 100.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computer system 100, as described below with respect to FIG. 2. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
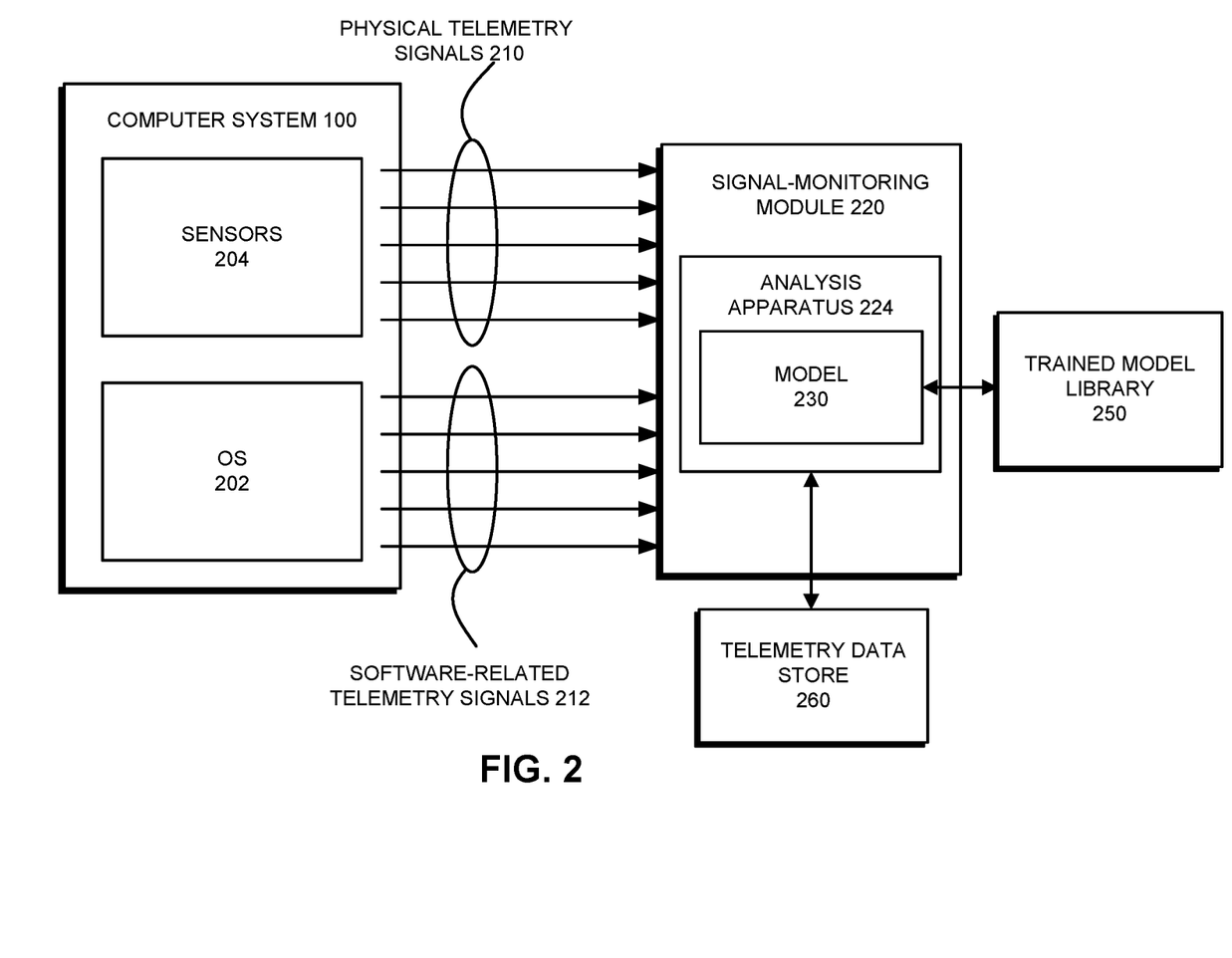
FIG. 2 illustrates a telemetry-analysis system in accordance with the disclosed embodiments.

FIG. 2 shows a telemetry-analysis system that performs prognostic pattern-recognition operations in accordance with an embodiment. In this example, computer system 200 is monitored using a number of telemetric signals, including physical telemetry signals 210 and software-related telemetry signals 212, which are transmitted to a signal-monitoring module 220. Signal-monitoring module 220 may assess the state of computer system 200 using these telemetry signals 210 and 212. For example, signal-monitoring module 220 may analyze telemetry signals 210 and 212 to detect and manage faults in computer system 200 and/or issue alerts when there is an anomaly or degradation risk in computer system 200.

Signal-monitoring module 220 may be provided by and/or implemented using a service processor associated with computer system 200. Alternatively, signal-monitoring module 220 may reside within a remote monitoring center (e.g., remote monitoring center 120 of FIG. 1B) that obtains telemetry signals 210 and 212 from computer system 200 over a network connection. Moreover, signal-monitoring module 220 may include functionality to analyze both real-time telemetry signals 210 and 212 and long-term historical telemetry data. For example, signal-monitoring module 220 may be used to detect anomalies in telemetry signals 210 and 212 received directly from the monitored computer system(s). Signal-monitoring module 220 may also be used during offline detection of anomalies from the monitored computer system(s) by processing archived and/or compressed telemetry data associated with the monitored computer system(s).

Prior to analyzing telemetry signals 210 and 212, analysis apparatus 224 may aggregate and pre-process telemetry signals 210 and 212. Moreover, during pre-processing of telemetry signals 210 and 212, analysis apparatus 224 may synchronize disparate sampling streams by standardizing timestamps of telemetry signals 210 and 212 from different domains. Next, analysis apparatus 224 may transform telemetry signals 210 and 212 into signals with uniform sampling rates. For example, analysis apparatus 224 may use an analytical re-sampling process (ARP) to up-sample signals with slower sampling rates to match the highest sampling rates in the aggregation of monitored telemetry signals 210 and 212.

The aggregated, pre-processed and transformed telemetry signals 210 and 212 can also be stored in a telemetry data store 260 to facilitate training prognostic pattern-recognition models, wherein each additional model is trained assuming one or more specific sensors have failed. This facilitates rapid recovery of the prognostics systems when one or more sensors fail as is described in more detail below. The additional models can be stored in a trained model library 250 as is also described further below.

In one or more embodiments, the nonlinear, nonparametric regression technique used by analysis apparatus 224 corresponds to a Multivariate State Estimation Technique (MSET). Analysis apparatus 224 may be trained using historical telemetry data from computer system 200 and/or similar computer systems. The historical telemetry data may be used to determine correlations among various telemetry signals 210 and 212 collected from the monitored computer system, wherein the correlations are embodied in a model 230 that can be used to detect incipient anomalies that arise during operation of computer system 200.

Those skilled in the art will appreciate that the nonlinear, nonparametric regression technique used in analysis apparatus 224 may be provided by any number of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term "MSET" as used in this specification can refer to (among other things) any of the 25 techniques outlined in Gribok, including Ordinary Least Squares (OLS), Support Vector Machines (SVM), Artificial Neural Networks (ANNs), MSET, or Regularized MSET (RMSET).

Training Process

Figure 3:
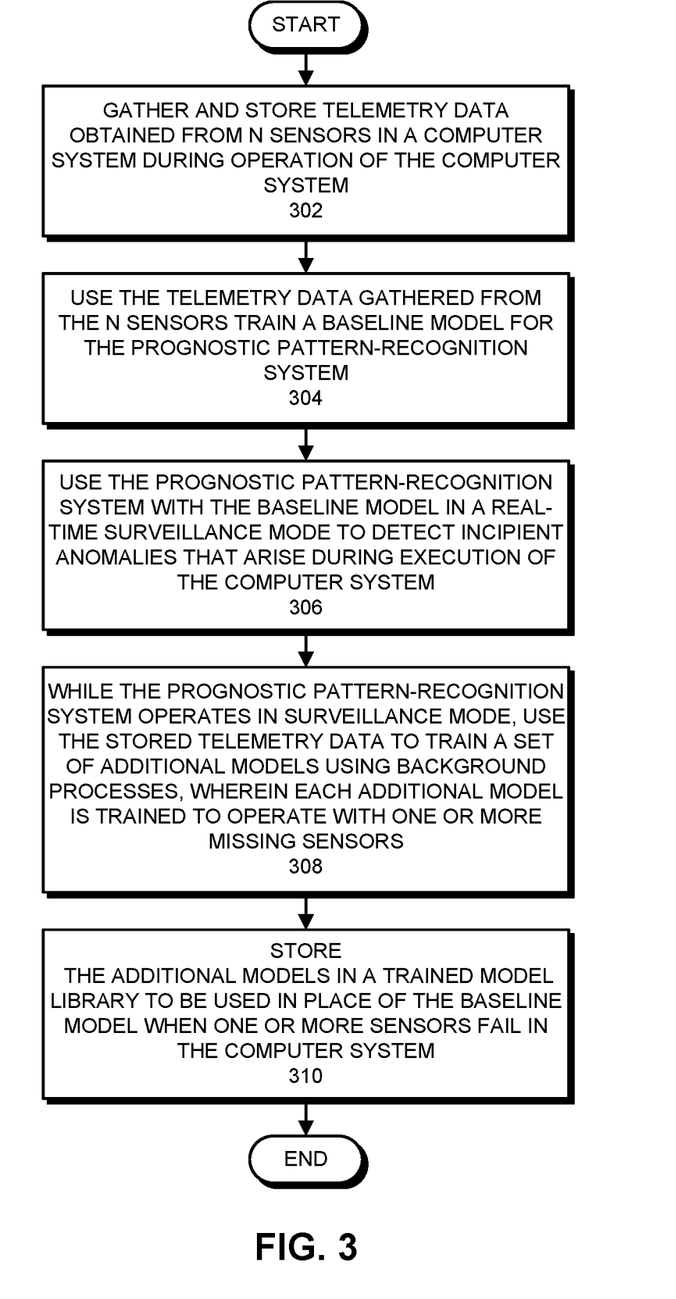
FIG. 3 presents a flowchart illustrating how a prognostic pattern-recognition system trains models using telemetry data in accordance with the disclosed embodiments.

FIG. 3 presents a flowchart illustrating how a prognostic pattern-recognition system trains models using telemetry data in accordance with the disclosed embodiments. First, the system gathers and stores telemetry data obtained from n sensors in the computer system during operation of the computer system (step 302). During this step, the system accumulates training data for all available n signals under surveillance and applies any necessary data-preparation or data-cleansing operations as in a conventional prognostic surveillance system. These data preparation and cleansing operations can include: up-sampling or down-sampling to achieve uniform sampling rates, un-quantization (or other resolution-enhancement operations), outlier detection/removal, and/or synchronization of variables having leads/lags with respect to other variables.

Next, the system uses the telemetry data gathered from the n sensors to train a baseline model for the prognostic pattern-recognition system (step 304). The prognostic pattern-recognition system is then used with the baseline model in a real-time surveillance mode to detect incipient anomalies that arise during execution of the computer system (step 306).

Next, while the prognostic pattern-recognition system operates in surveillance mode, the system uses the stored telemetry data to train a set of additional models, wherein each additional model is trained to operate with one or more missing sensors (step 308). For example, the system can use one or more background processes to go through the time-series signals masking one signal at a time, and performing an MSET training computation on each set of n−1 signals to produce n different models. Next, the system spawns additional background processes to go through the time-series signals masking all possible signal pairs of signals, two at a time, and performs an MSET training computation on each set of n−2 signals. (Note that there will be [n−1]*[n−2] additional models trained during this step.)

Finally, the system stores the additional models in a trained model library to be used in place of the baseline model when one or more sensors fail in the computer system (step 310).

Handling a Sensor Failure

Figure 4:
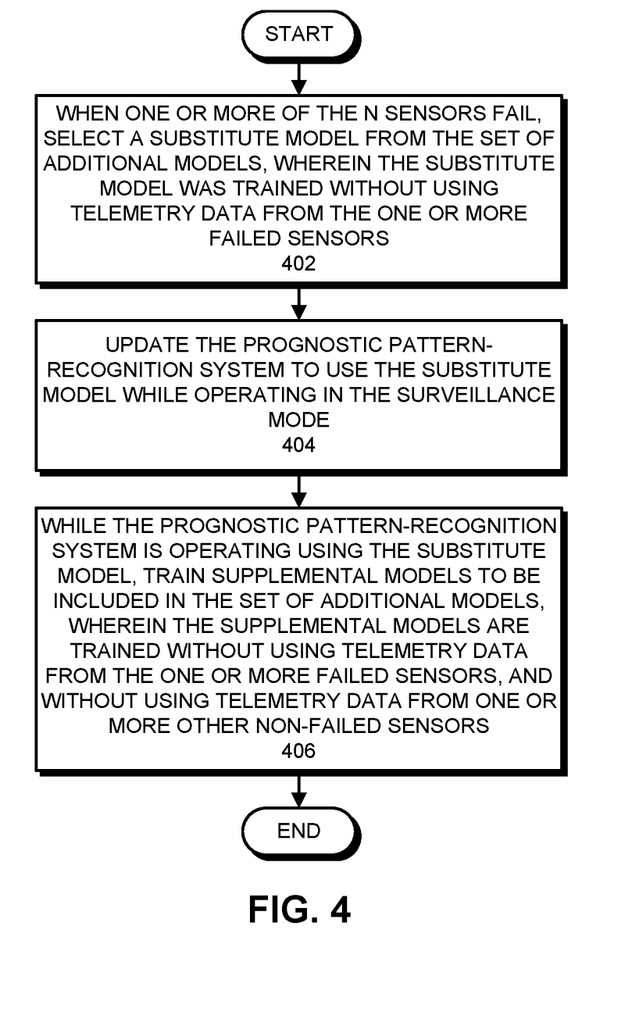
FIG. 4 presents a flowchart illustrating how a prognostic pattern-recognition system swaps models after a sensor failure in accordance with the disclosed embodiments.

FIG. 4 presents a flowchart illustrating how a prognostic pattern-recognition system swaps models after a sensor failure in accordance with the disclosed embodiments. More specifically, when one or more of the n sensors fails, the system selects a substitute model from the set of additional models, wherein the substitute model was trained without using telemetry data from the one or more failed sensors (step 402). The system then updates the prognostic pattern-recognition system to use the substitute model while operating in the surveillance mode (step 404). In this way, the prognostic pattern-recognition system continues operating in surveillance mode without interruption. Next, while the prognostic pattern-recognition system is operating using the substitute model, the system trains supplemental models to be included in the set of additional models, wherein the supplemental models are trained without using telemetry data from the one or more failed sensors, and without using telemetry data from one or more other non-failed sensors (step 406).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for training a prognostic pattern-recognition system to detect incipient anomalies that arise during execution of a computer system, comprising:
   gathering and storing telemetry data obtained from n sensors in the computer system during operation of the computer system;
   using the telemetry data gathered from the n sensors to train a baseline model for the prognostic pattern-recognition system;
   using the prognostic pattern-recognition system with the baseline model in a surveillance mode to detect incipient anomalies that arise during execution of the computer system;
   using the stored telemetry data to train a set of additional models, wherein each additional model is trained to operate with one or more missing sensors;
   storing the additional models to be used in place of the baseline model when one or more sensors fail in the computer system; and
   when one or more of the n sensors in the computer system fails:
      selecting a substitute model from the set of additional models, wherein the substitute model was trained without using telemetry data from the one or more failed sensors,
      updating the prognostic pattern-recognition system to use the substitute model while operating in the surveillance mode, and
      while the prognostic pattern-recognition system is operating using the substitute model, training supplemental models to be included in the set of additional models, wherein the supplemental models are trained without using telemetry data from the one or more failed sensors, and without using telemetry data from one or more other non-failed sensors.

2. The method of claim 1, wherein training the set of additional models includes:
   training additional models to operate with any one of the n sensors missing;
   training additional models to operate with any combination of two of the n sensors missing; and
   training additional models to operate with more than two of the n sensors missing.

3. The method of claim 1, wherein the set of additional models are trained using background processes while the prognostic pattern-recognition system operates in the surveillance mode.

4. The method of claim 1, wherein detecting an incipient anomaly includes detecting one or more of the following:
   an impending failure of the computer system; and
   a malicious-intrusion event in the computer system.

5. The method of claim 1, wherein the baseline model and the set of additional models are trained using a nonlinear, nonparametric (NLNP) regression technique.

6. The method of claim 1, wherein the telemetry data includes:
   data gathered from physical sensors in the computer system that monitor physical performance parameters, including at least one or more of temperature, voltage, fan speeds, current, vibration, and acoustic parameters; and
   software-related telemetry parameters, including one or more of processor load, memory usage, cache usage, system throughput, queue lengths, I/O traffic, and quality of service (QOS).

7. A non-transitory computer-readable storage medium storing instructions that when executed by a computer cause the computer to perform a method for training a prognostic pattern-recognition system to detect incipient anomalies that arise during execution of a computer system, the method comprising:
   gathering and storing telemetry data obtained from n sensors in the computer system during operation of the computer system;
   using the telemetry data gathered from the n sensors to train a baseline model for the prognostic pattern-recognition system;
   using the prognostic pattern-recognition system with the baseline model in a surveillance mode to detect incipient anomalies that arise during execution of the computer system;
   using the stored telemetry data to train a set of additional models, wherein each additional model is trained to operate with one or more missing sensors;
   storing the additional models to be used in place of the baseline model when one or more sensors fail in the computer system; and
   when one or more of the n sensors in the computer system fails:
      selecting a substitute model from the set of additional models, wherein the substitute model was trained without using telemetry data from the one or more failed sensors,
      updating the prognostic pattern-recognition system to use the substitute model while operating in the surveillance mode, and
      while the prognostic pattern-recognition system is operating using the substitute model, training supplemental models to be included in the set of additional models, wherein the supplemental models are trained without using telemetry data from the one or more failed sensors, and without using telemetry data from one or more other non-failed sensors.

8. The non-transitory computer-readable storage medium of claim 7, wherein using the stored telemetry data to train the set of additional models involves:
   training additional models to operate with any one of the n sensors missing;
   training additional models to operate with any combination of two of the n sensors missing; and
   training additional models to operate with more than two of the n sensors missing.

9. The non-transitory computer-readable storage medium of claim 7, wherein using the stored telemetry data to train the set of additional models involves using background processes to train the set of additional models while the prognostic pattern-recognition system operates in the surveillance mode.

10. The non-transitory computer-readable storage medium of claim 7, wherein using the prognostic pattern-recognition system with the baseline model in the surveillance mode to detect incipient anomalies that arise during execution of the computer system involves detecting one or more of the following:
an impending failure of the computer system; and
a malicious-intrusion event in the computer system.

11. The non-transitory computer-readable storage medium of claim 7, wherein using the telemetry data gathered from the n sensors to train the baseline model involves using a nonlinear, nonparametric (NLNP) regression technique.

12. The non-transitory computer-readable storage medium of claim 7, wherein the telemetry data includes:
data gathered from physical sensors in the computer system that monitor physical performance parameters, including at least one or more of temperature, voltage, fan speeds, current, vibration, and acoustic parameters; and
software-related telemetry parameters, including one or more of processor load, memory usage, cache usage, system throughput, queue lengths, I/O traffic, and quality of service (QOS).

13. A system that trains a prognostic pattern-recognition system to detect incipient anomalies that arise during execution of a computer system, comprising:
a training mechanism that trains a prognostic pattern-recognition system, wherein during operation, the training mechanism,
gathers and stores telemetry data obtained from n sensors in the computer system during operation of the computer system,
uses the telemetry data gathered from the n sensors to train a baseline model for the prognostic pattern-recognition system,
uses the stored telemetry data to train a set of additional models, wherein each additional model is trained to operate with one or more missing sensors, and
stores the additional models to be used in place of the baseline model when one or more sensors fail in the computer system; and
a detection mechanism that uses the prognostic pattern-recognition system with the baseline model in a surveillance mode to detect incipient anomalies that arise during execution of the computer system wherein when one or more of the n sensors in the computer system fails the training mechanism:
selects a substitute model from the set of additional models, wherein the substitute model was trained without using telemetry data from the one or more failed sensors,
updates the prognostic pattern-recognition system to use the substitute model while operating in the surveillance mode, and
while the prognostic pattern-recognition system is operating using the substitute model, trains supplemental models to be included in the set of additional models, wherein the supplemental models are trained without using telemetry data from the one or more failed sensors, and without using telemetry data from one or more other non-failed sensors.

14. The system of claim 13, wherein the training mechanism trains the set of additional models using background processes while the prognostic pattern-recognition system operates in the surveillance mode.

* * * * *